United States Patent [19]

Choi

[11] Patent Number: 5,913,007
[45] Date of Patent: Jun. 15, 1999

[54] ENVELOPE DETECTION APPARATUS FOR VIDEO CASSETTE RECORDER

[75] Inventor: Kyung-Hwan Choi, Suwon, Rep. of Korea

[73] Assignee: Samsung Electronics Co., Ltd., Kyungki-do, Rep. of Korea

[21] Appl. No.: 08/791,169

[22] Filed: Jan. 30, 1997

[30] Foreign Application Priority Data

Jan. 30, 1996 [KR] Rep. of Korea .......... 96-2090

[51] Int. Cl.$^6$ ............... H04N 5/91; H04N 7/00
[52] U.S. Cl. .............. 386/46; 386/124; 386/93; 386/9
[58] Field of Search .............. 386/1, 9, 35, 46, 386/93, 124–126, 68, 21; 369/59, 124; 327/50; 360/64, 77.13; H04N 5/91, 7/00

[56] References Cited

U.S. PATENT DOCUMENTS

| | | | |
|---|---|---|---|
| 5,255,126 | 10/1993 | Matsuzawa et al. | 360/27 |
| 5,345,271 | 9/1994 | Shin | 348/525 |
| 5,436,771 | 7/1995 | Yun | 360/65 |
| 5,481,417 | 1/1996 | Yokoyama et al. | 360/73.08 |
| 5,490,017 | 2/1996 | Nakamura et al. | 360/10.2 |
| 5,543,974 | 8/1996 | Sugita | 360/33.1 |
| 5,561,529 | 10/1996 | Tanaka et al. | 386/77 |
| 5,600,661 | 2/1997 | Shimokoriyama | 371/40.1 |
| 5,648,855 | 7/1997 | Yanagihara | 386/80 |
| 5,684,916 | 11/1997 | Hong | 386/68 |

*Primary Examiner*—Wendy Garber
*Assistant Examiner*—Vincent F. Boccio
*Attorney, Agent, or Firm*—Sughrue, Mion, Zinn, Macpeak & Seas, PLLC

[57] ABSTRACT

A video cassette recorder envelope detection apparatus which can accurately detect an envelope reflecting the state of a system. The envelope detection apparatus may include a reference voltage setter for setting a second reference value which is altered according to comparison of a level of the video signal with that of a preset first reference value, and a voltage comparator for comparing the level of the video signal with that of the second reference value altered in the reference voltage setter. The envelope detection apparatus may also include a reference voltage setter for receiving a bit error rate calculated from an error correction result of the video signal and setting a reference value based on the received bit error rate (BER), and a voltage comparator for comparing the level of the video signal with that of the reference value set in the reference voltage setter.

24 Claims, 20 Drawing Sheets

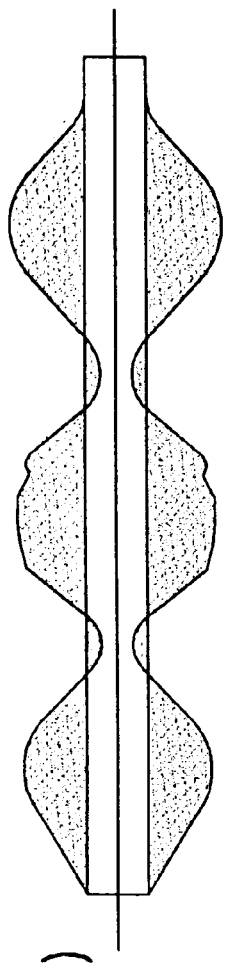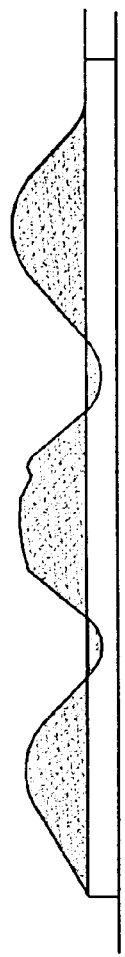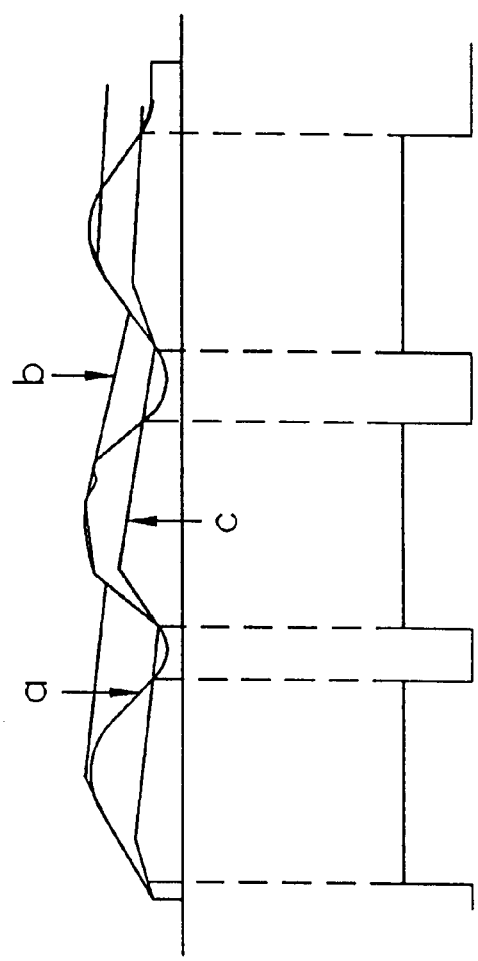
FIG. 5A (PRIOR ART)
FIG. 5B (PRIOR ART)
FIG. 5C (PRIOR ART)
FIG. 5D (PRIOR ART)

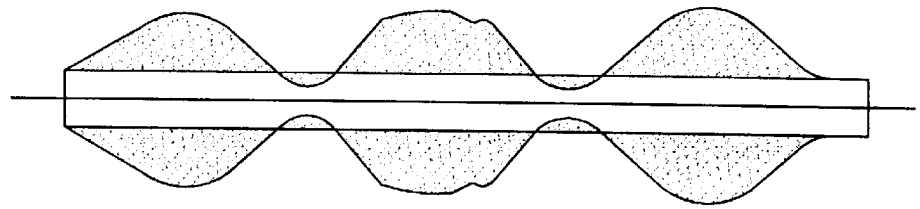
FIG.9A
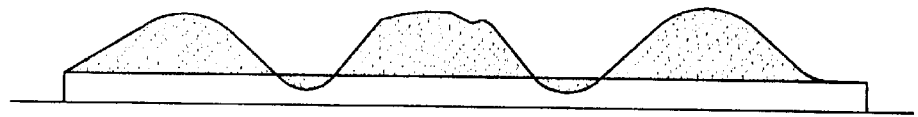
FIG.9B
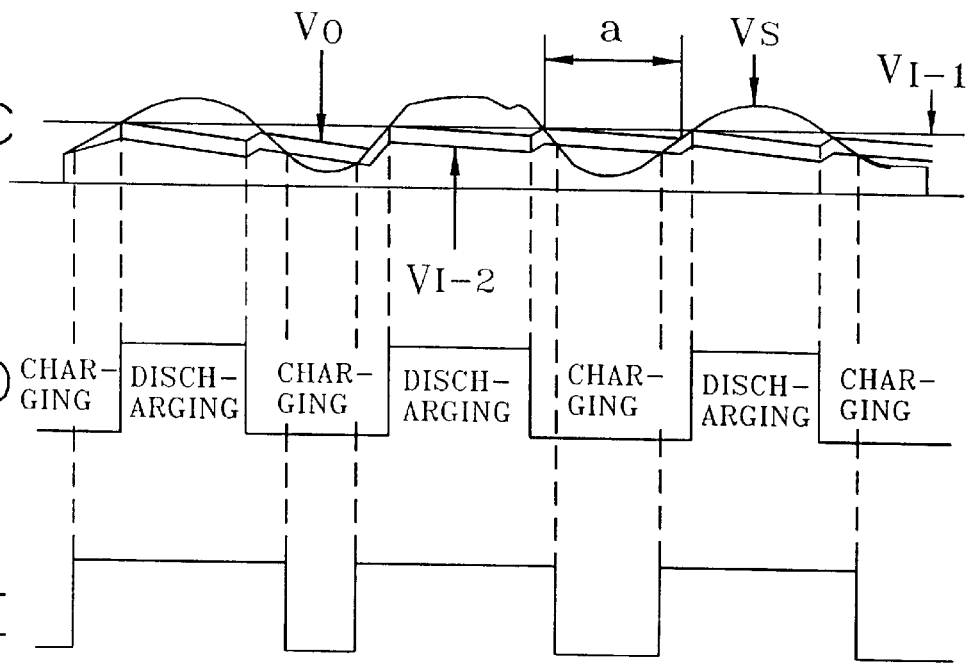

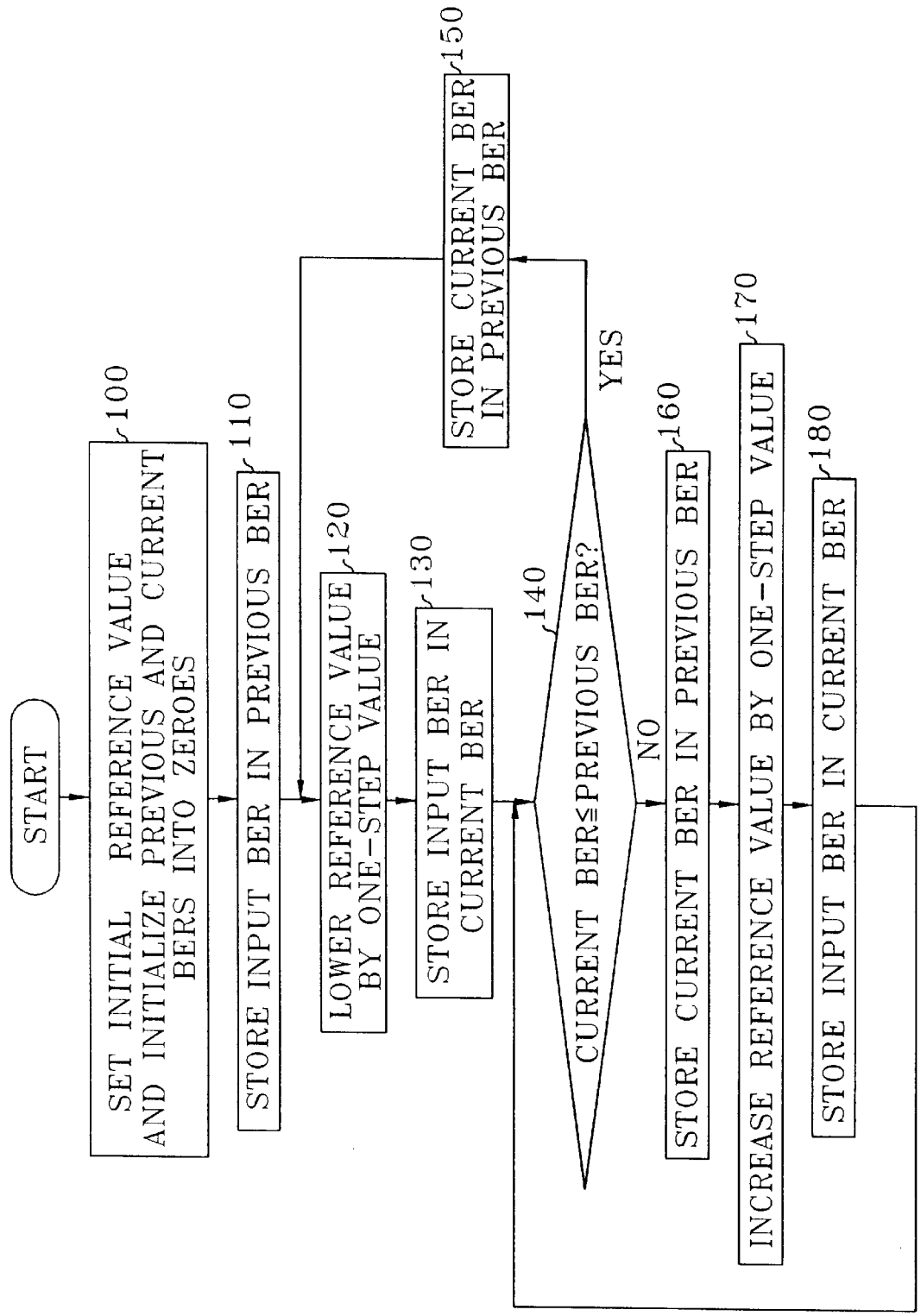

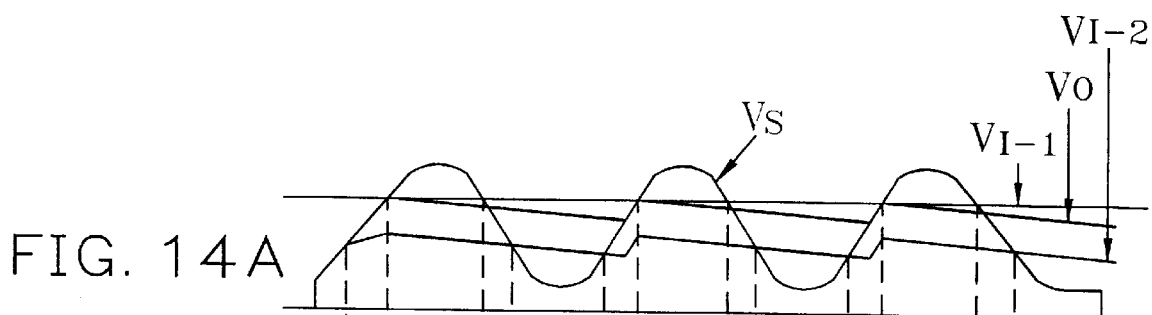
FIG. 14A
FIG. 14B
FIG. 14C
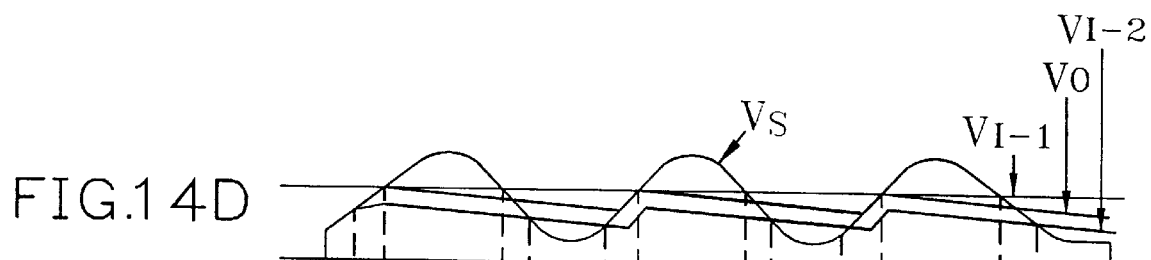
FIG. 14D
FIG. 14E
FIG. 14F

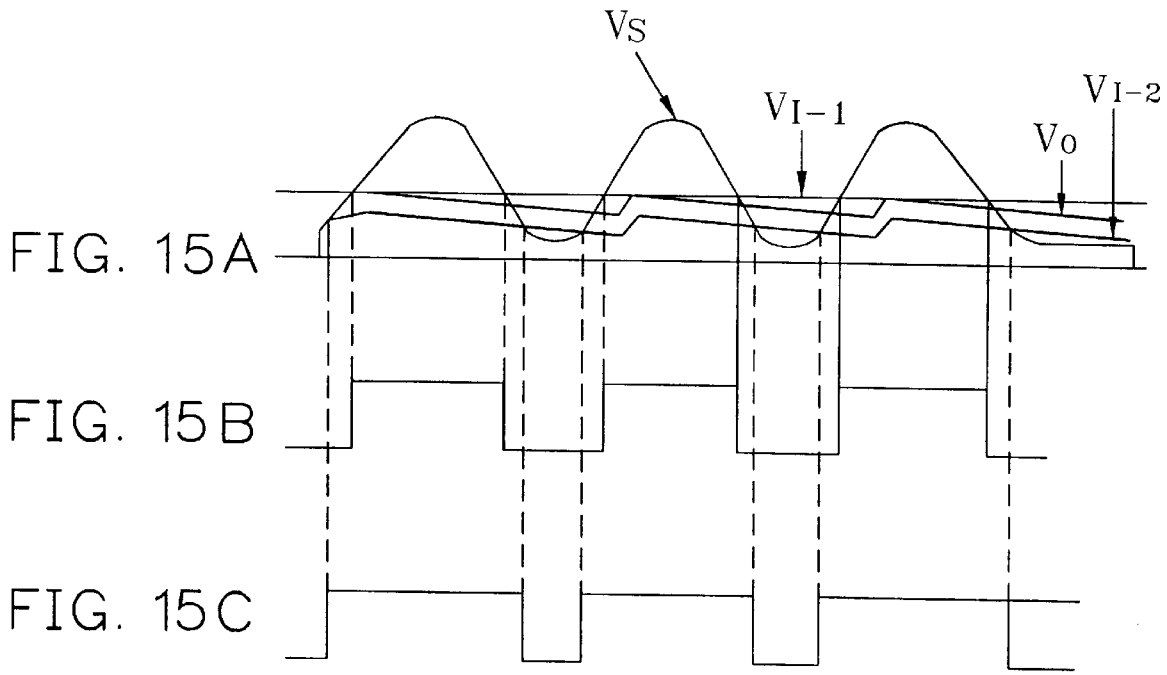
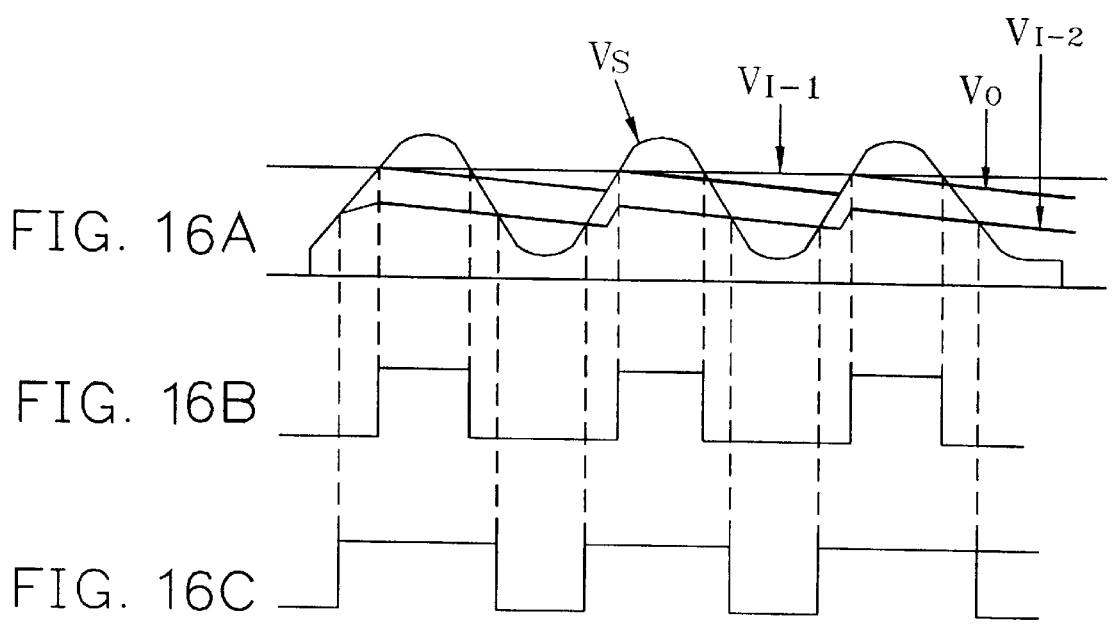

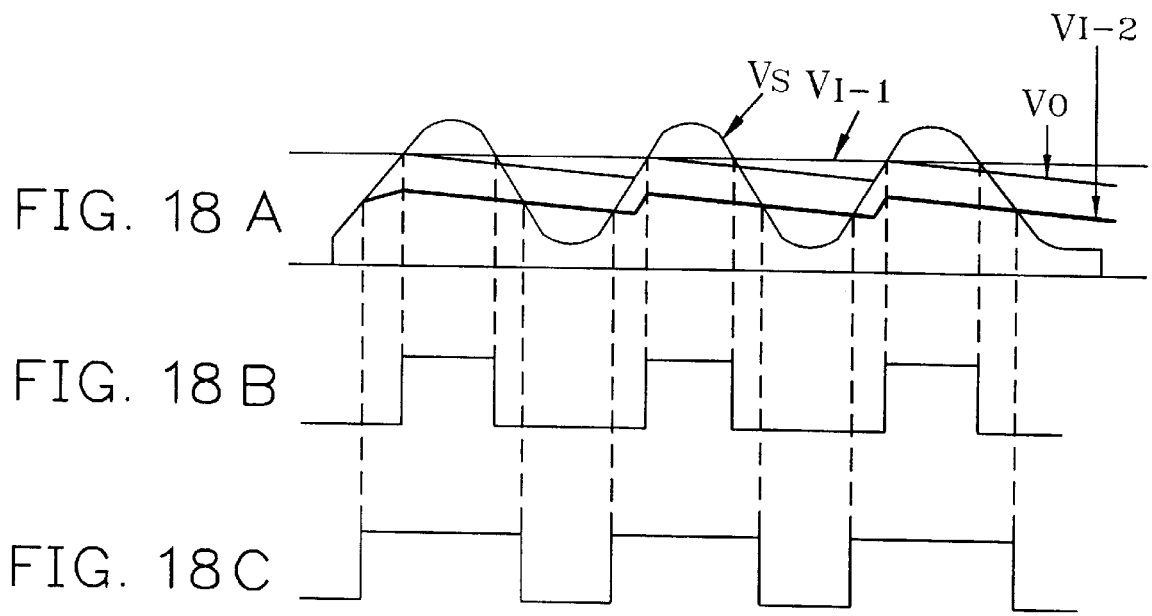
FIG. 18 A
FIG. 18 B
FIG. 18 C
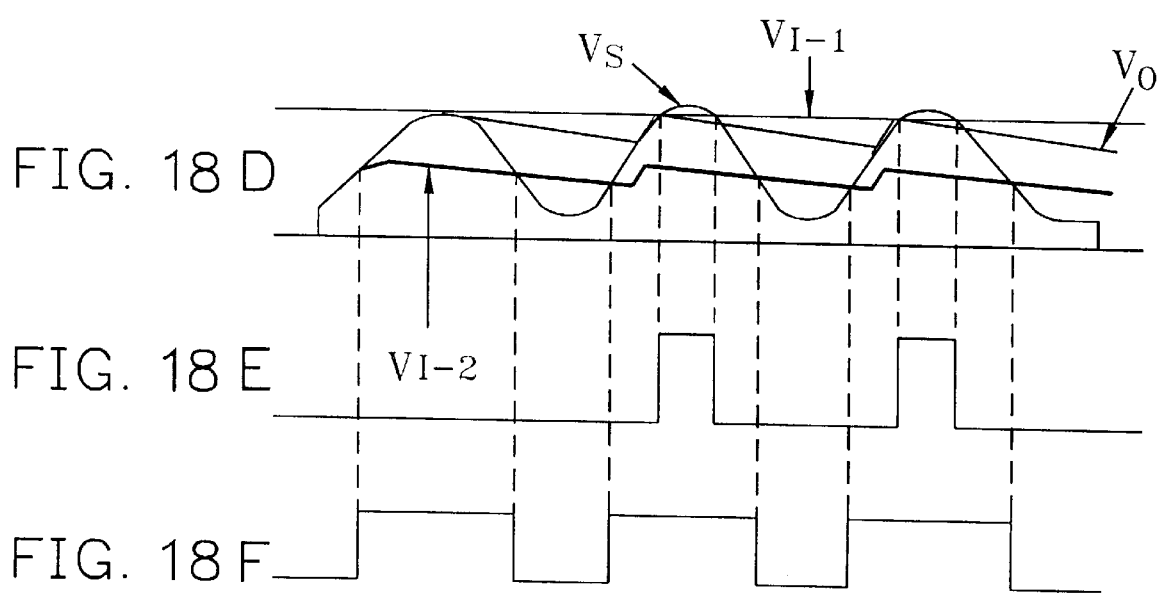
FIG. 18 D
FIG. 18 E
FIG. 18 F

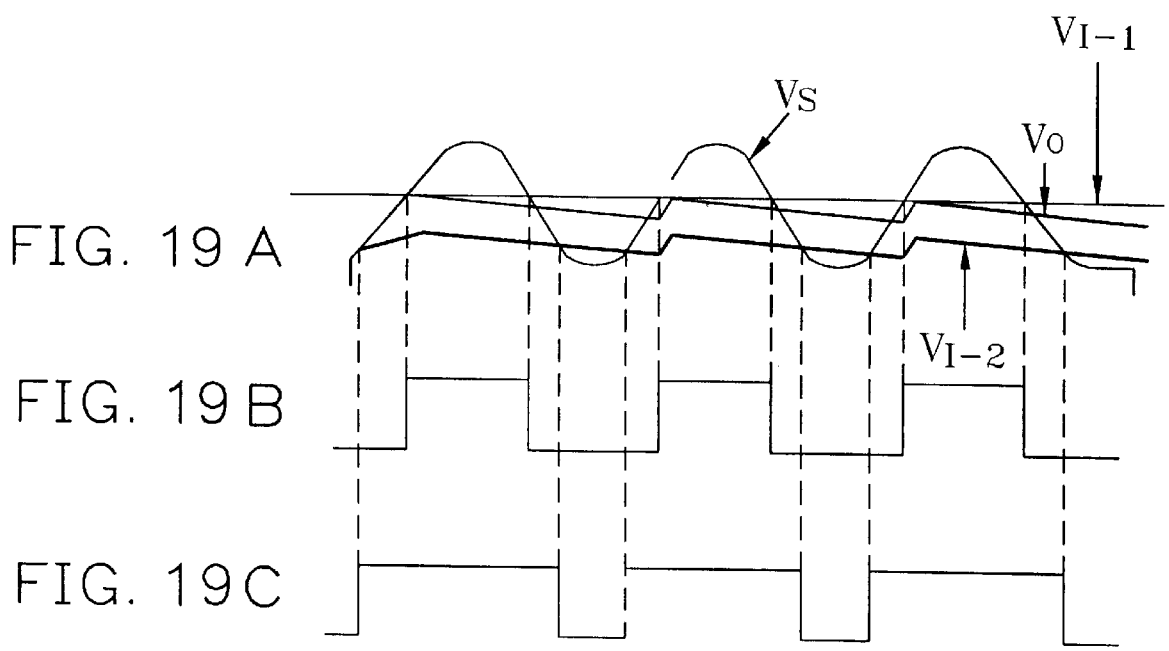
FIG. 19 A
FIG. 19 B
FIG. 19 C
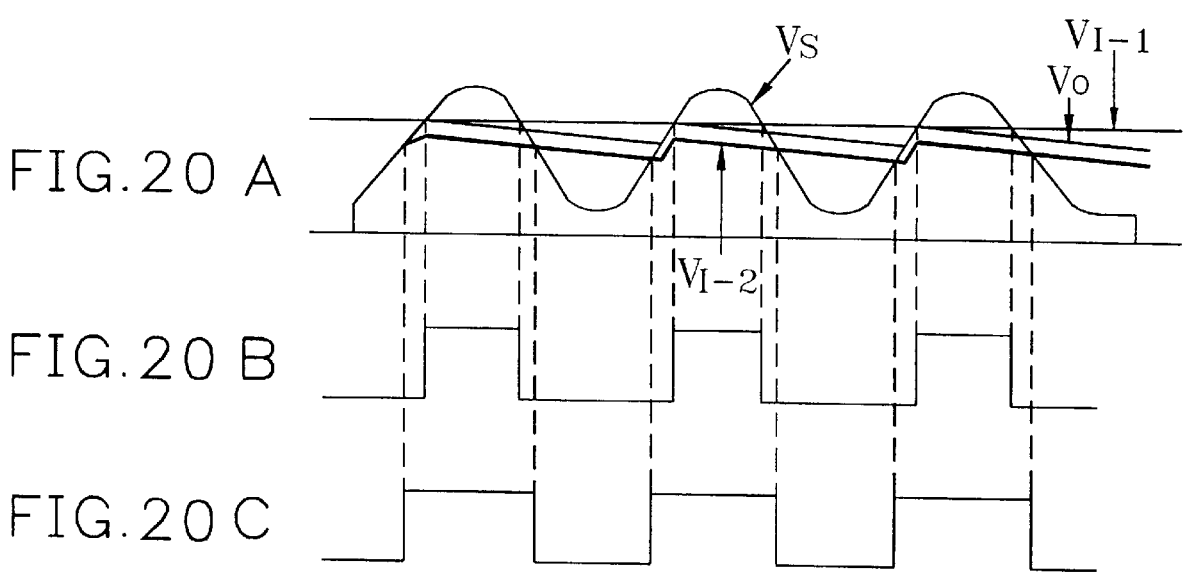
FIG. 20 A
FIG. 20 B
FIG. 20 C

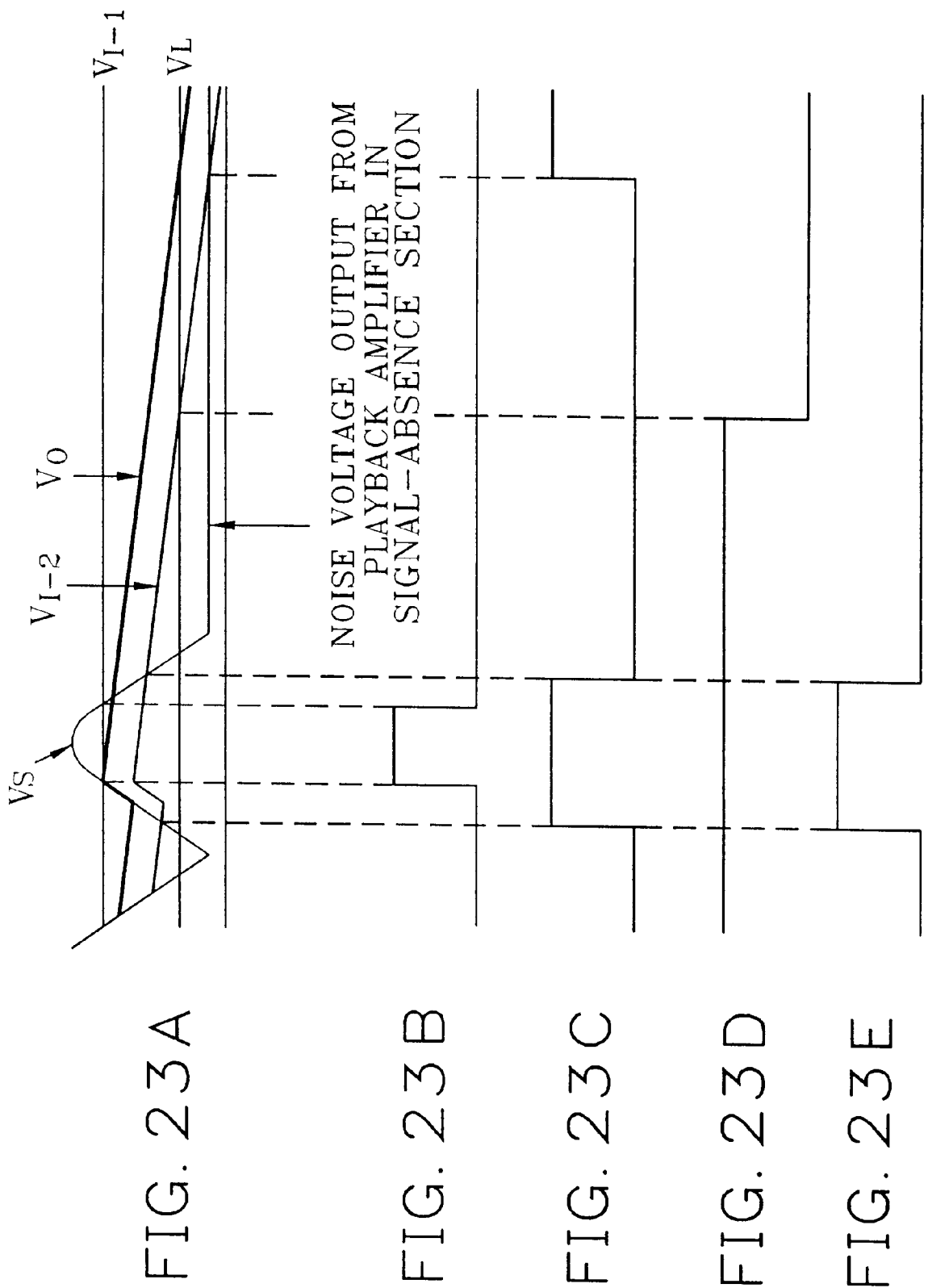

ENVELOPE DETECTION APPARATUS FOR VIDEO CASSETTE RECORDER

BACKGROUND OF THE INVENTION

1. Field of the Invention

The present invention relates to an envelope detection apparatus for a video cassette recorder (VCR). The present application is based upon Korean Application No. 96-2090, which is incorporated herein by reference.

2. Description of the Related Art

A conventional VCR detects an amplitude of a video signal read out from a video tape, that is, an envelope. When an envelope is detected not more than a predetermined level for a certain time or more, one VCR judges that there are no signals recorded on the video tape, and displays only a blue color background on a monitor. When an envelope is detected not more than a predetermined level for a certain time, the other VCR judges that a video signal is dropped out and compensates the drop-out portion using a previous video signal. As described above, it is essential to detect an envelope in VCR technology since an envelope detection result is used for other functions of the VCR.

An operation of an envelope detection apparatus for a conventional analog VCR shown in FIG. 1 will be described below with reference to FIGS. 2 and 3A through 3H. In FIG. 1, a playback amplifier 11 receives a video signal read out from a video tape via a playback head (not shown), amplifies the received video signal by a predetermined amplification factor, and outputs the amplified signal shown in FIG. 3A to a rectifier 12. The rectifier 12 rectifies the input signal and outputs the rectified signal shown in FIG. 3B to a smoothing portion 13. The smoothing portion 13 smooths the input signal. The smoothed signal Vs shown in FIG. 3C is input to a non-inverted input terminal of a comparator 14 shown in FIG. 2. A predetermined reference value $V_I$ is input to an inverted input terminal of the comparator 14. Here, the reference value $V_I$ is pre-set based on an ordinary noise level. The comparator 14 compares the signal Vs with reference value $V_I$ and generates a rectangular wave shown in FIG. 3D representing an envelope detection result.

The above-described envelope detection apparatus cannot obtain a desired result when an output level of the playback amplifier is varied due to factors such as a state of a signal recorded on a video tape, an output error according to temperature variation of the playback amplifier and a state of a head. For example, when an amplification factor of the playback amplifier 11 is enlarged due to the above-described factors, the output signal Vs of the smoothing portion 13, has a value more than the reference value $V_I$, on the whole, as shown in FIG. 3E. As a result, the width of the envelope detection signal is increased, as shown in FIG. 3F. Also, the output signal Vs of the smoothing portion 13 when the amplification factor of the playback amplifier 11 is decreased is shown in FIG. 3G, in which case the width of the envelope detection signal is decreased, as shown in FIG. 3H.

The envelope detection apparatus of Japanese laid-open patent publication No. Heisei 7-121983 filed by Matsushida solves this problem by using only a constant reference value, in spite of variation of the amplification factor of the playback amplifier 11. FIG. 4 shows this apparatus and FIGS. 5A through 5D show waveform diagrams used for explaining the operation of the FIG. 4 apparatus.

In FIG. 4, since the operations of a playback amplifier 11, a rectifier 12, and a smoothing portion 13 are the same as those of the corresponding blocks having the same reference numerals in FIG. 1, the description thereof will be omitted. FIG. 5A shows an output waveform of the playback amplifier 11, and FIG. 5B shows an output waveform of the rectifier 12. A peak detector 24 detects a peak level "b" from an output signal "a" of the smoothing portion 13, as shown in FIG. 5C. A leak portion 25 reduces the peak level "b" by a predetermined level and outputs a signal "c" shown in FIG. 5C. A reference voltage setter 26 sets the output signal "c" of the leak portion 25 to be the reference voltage when the output signal "c" of the leak portion 25 is smaller than the set reference voltage, and prevents a detection error in the absence of a signal. A comparator 27 compares the output signal "a" of the smoothing portion 13 with the reference voltage output from the reference voltage setter 26, and outputs the comparison result as an envelope detection result shown in FIG. 5D. Therefore, a constant envelope detection result can be obtained even though the output level of the playback amplifier is varied. Meanwhile, a speed setter 28 varies a filter characteristic of the smoothing portion 13 and a time constant of the leak portion 25 according to a speed variation, thereby enabling detection of an envelope during a speed reproduction which is different from a normal speed reproduction, for example, a multiple speed reproduction.

However, actual envelope detection is affected by the circumstances of the whole system, and an analog VCR can most accurately detect an envelope when considering a carrier-to-noise (C/N) ratio, while a digital VCR can when considering a bit error rate (BER). In other words, although the amplification factor of the playback amplifier is not the same, an identical envelope can be detected if a C/N ratio or a BER is the same.

In the above prior art, the envelope detection relies on only the amplitude of the output signal of the playback amplifier. Thus, when an amplitude difference of a signal output from the playback amplifier is larger, an envelope cannot be more accurately detected. Furthermore, the speed setter 28 uses a time constant corresponding to each speed in order to detect envelopes at various reproduction speeds. As a result, a circuit for setting such a time constant is complicated and a separate circuit is needed for selecting a corresponding time constant.

SUMMARY OF THE INVENTION

It is an object of the present invention to solve the above problem by providing an envelope detection apparatus capable of detecting an envelope more accurately from a reproduced signal by altering a reference voltage which is a judgment basis of an envelope detection according to an output level of the reproduced signal.

It is another object of the present invention to provide an envelope detection apparatus capable of detecting an envelope more accurately by setting a reference voltage to reflect a present state of a system and using a set reference voltage.

To accomplish the above object of the present invention, there is provided an envelope detection apparatus for detecting an envelope of a video signal read from a video tape. The envelope detection apparatus comprises a reference voltage setting means for setting a second reference value which is altered according to comparison of a level of the video signal with that of a preset first reference value, and a voltage comparator for comparing the level of the video signal with that of the second reference value altered in the reference voltage setting means to thereby detect the envelope from the video signal.

There is also provided an envelope detection apparatus for detecting an envelope of a video signal read from a video tape. The envelope detection apparatus comprises a reference voltage setting means for receiving a bit error rate calculated from an error correction result of the video signal and setting a reference value based on the received bit error rate, and a voltage comparator for comparing the level of the video signal with that of the reference value set in the reference voltage setting means to thereby detect the envelope from the video signal.

BRIEF DESCRIPTION OF THE DRAWINGS

The preferred embodiments are described with reference to the drawings wherein:

FIGS. 5A through 5D are waveform diagrams of the respective elements of FIG. 4;

FIGS. 9A through 9E are waveform diagrams of the respective elements of FIGS. 7 and 8;

FIG. 13 is a flow-chart diagram representing an automatic setting operation of a reference value of the first reference value setter shown in FIG. 12;

FIGS. 14A through 14C are waveform diagrams of the respective elements of FIG. 12;

FIGS. 14D through 14F are waveform diagrams representing an envelope detection operation when an amplification factor of a playback amplifier is small and a bit error rate thereof is the same;

FIGS. 15A through 15C are waveform diagrams representing an envelope detection operation when a bit error rate (BER) is smaller than that of FIGS. 14A through 14C;

FIGS. 16A through 16C are waveform diagrams representing an envelope detection operation when a BER is larger than that of FIGS. 14A through 14C;

FIGS. 18A through 18C are waveform diagrams of the respective elements of FIG. 17;

FIGS. 18D through 18F are waveform diagrams representing an envelope detection operation when an amplification factor of the playback amplifier is small and a BER is identical to that of FIGS. 18A through 18C;

FIGS. 19A through 19C are waveform diagrams representing an envelope detection operation when a BER is smaller than that of FIGS. 18A through 18C;

FIGS. 20A through 20C are waveform diagrams representing an envelope detection operation when a BER is larger than that of FIGS. 18A through 18C;

FIG. 23A through 23E are waveform diagrams of the respective elements of FIG. 22.

DETAILED DESCRIPTION OF THE INVENTION

Preferred embodiments of the present invention will be described in detail with reference to the accompanying FIGS. 6 through 23E.

Figure 6:
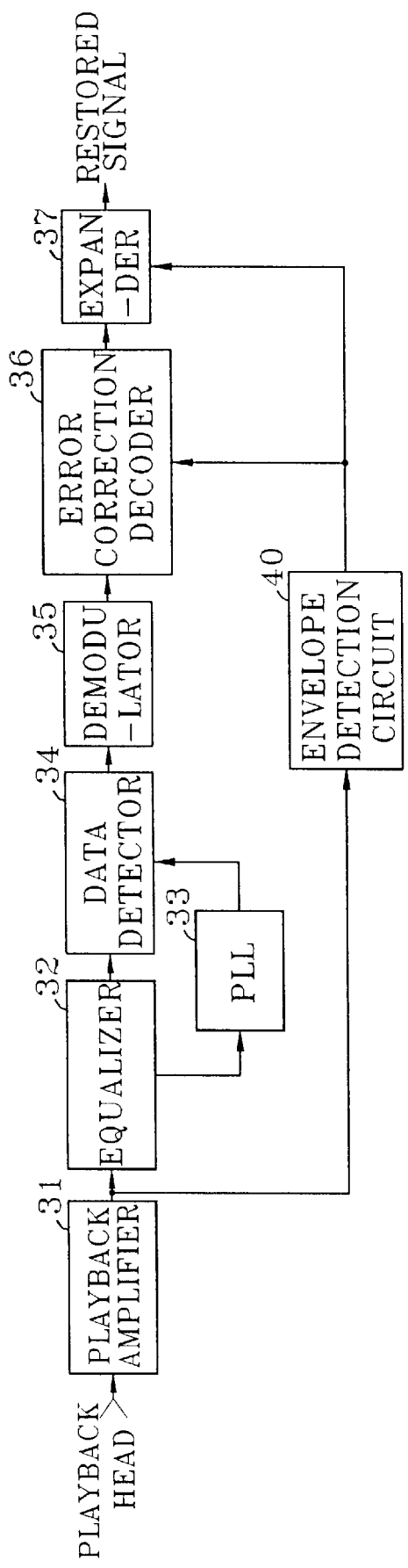
FIG. 6 is a block diagram of a digital VCR adopting an envelope detection circuit according to a first embodiment of the present invention.

FIG. 6 shows a first embodiment of a digital VCR in which an envelope detection circuit is adopted. The VCR includes a playback amplifier 31 which amplifies a video signal read from a video tape via a playback head (not shown) by a predetermined amplification factor, and outputs the amplified signal to an equalizer 32. The equalizer 32 shapes the waveform of the amplified signal, and a phase locked loop (PLL) 33 detects data containing video information according to a clock frequency output from the PLL 33. A demodulator 35 demodulates the detected data into a signal which is the same as before being recorded on a recording medium. An error correction decoder 36 error-corrects an error of the demodulated signal and an expander 37 restores the error-corrected signal into an original signal. Meanwhile, an envelope detection circuit 40 detects an envelope from the output signal supplied from the playback amplifier 31. The error correction decoder 36 and the expander 37 use the envelope detection result output from the envelope detection circuit 40 in the above-described signal processing.

Figure 7:
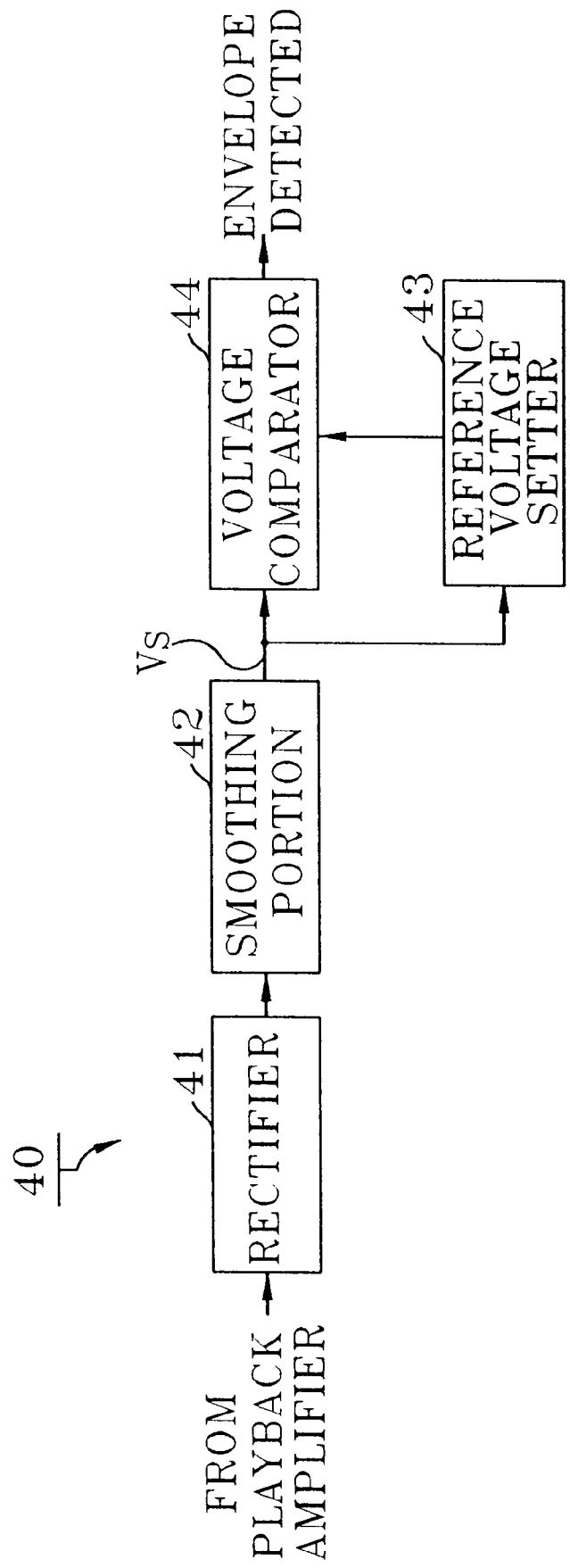
FIG. 7 is a block diagram of the envelope detection circuit shown in FIG. 6.

The envelope detection circuit 40, shown in more detail in FIG. 7, includes a rectifier 41 and a smoothing portion 42. A reference voltage setter 43 traces the level of the reproduced signal using the output signal supplied from the smoothing portion 42 and sets a reference voltage. A voltage comparator 44 generates an envelope detection resulting value on the basis of the level comparison of the output signals of the smoothing portion 42 and the reference voltage setter 43.

Figure 8:
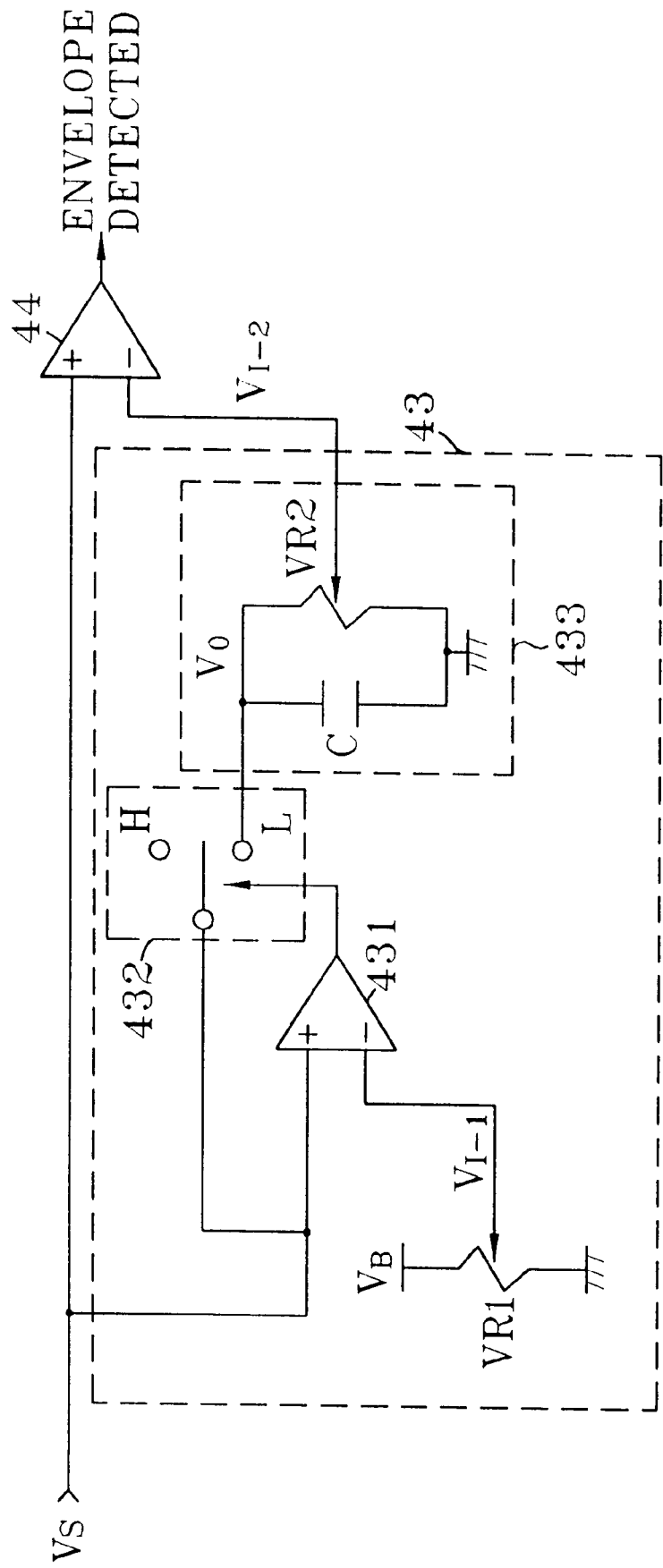
FIG. 8 is a circuit diagram of the reference voltage setter and the voltage comparator of FIG. 7.

A detailed circuit diagram of the reference voltage setter 43 and the voltage comparator 44 is shown in FIG. 8. The reference voltage setter 43 includes a comparator 431 for comparing the output signal Vs of the smoothing portion 42 with a predetermined first reference value $V_{r-1}$, and generating a switching control signal indicating the comparison result, a switch 432 for switching the output signal Vs of the smoothing portion 42 to the next stage according to the switching control signal supplied from the comparator 431, and a reference value setter 433 for charging or discharging the voltage of the signal applied via the switch 432 according to the connection state of the switch 432 and outputting a second reference value $V_{r-2}$ to be supplied to the voltage comparator 44. In the reference value setter 433, a capacitor C is connected in parallel with a variable resistor VR2.

The operation of the apparatus having the above-described construction will be described with reference to the waveform diagrams of FIGS. 9A–9E.

Figure 1:
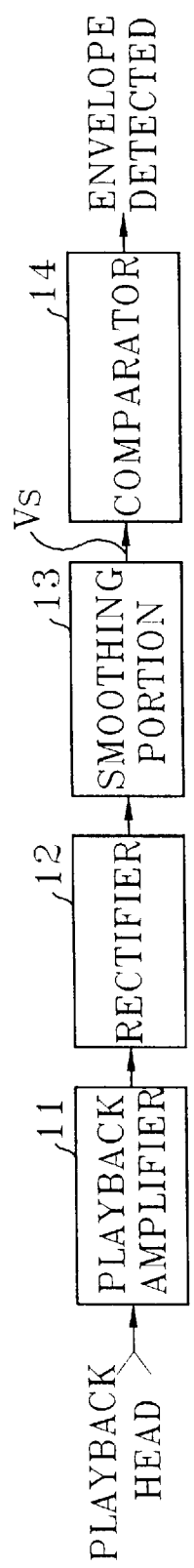
FIG. 1 is a block diagram showing a conventional envelope detection apparatus.
Figure 2:
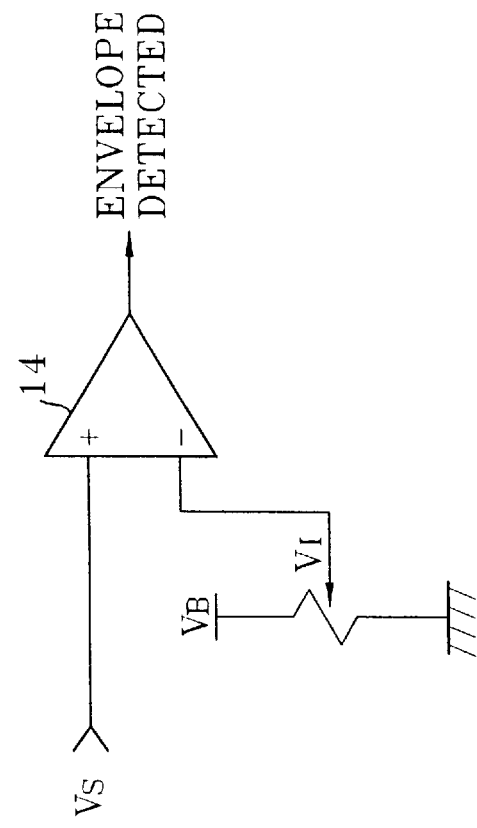
FIG. 2 is a circuit diagram of the comparator of FIG. 1.
Figure 3:
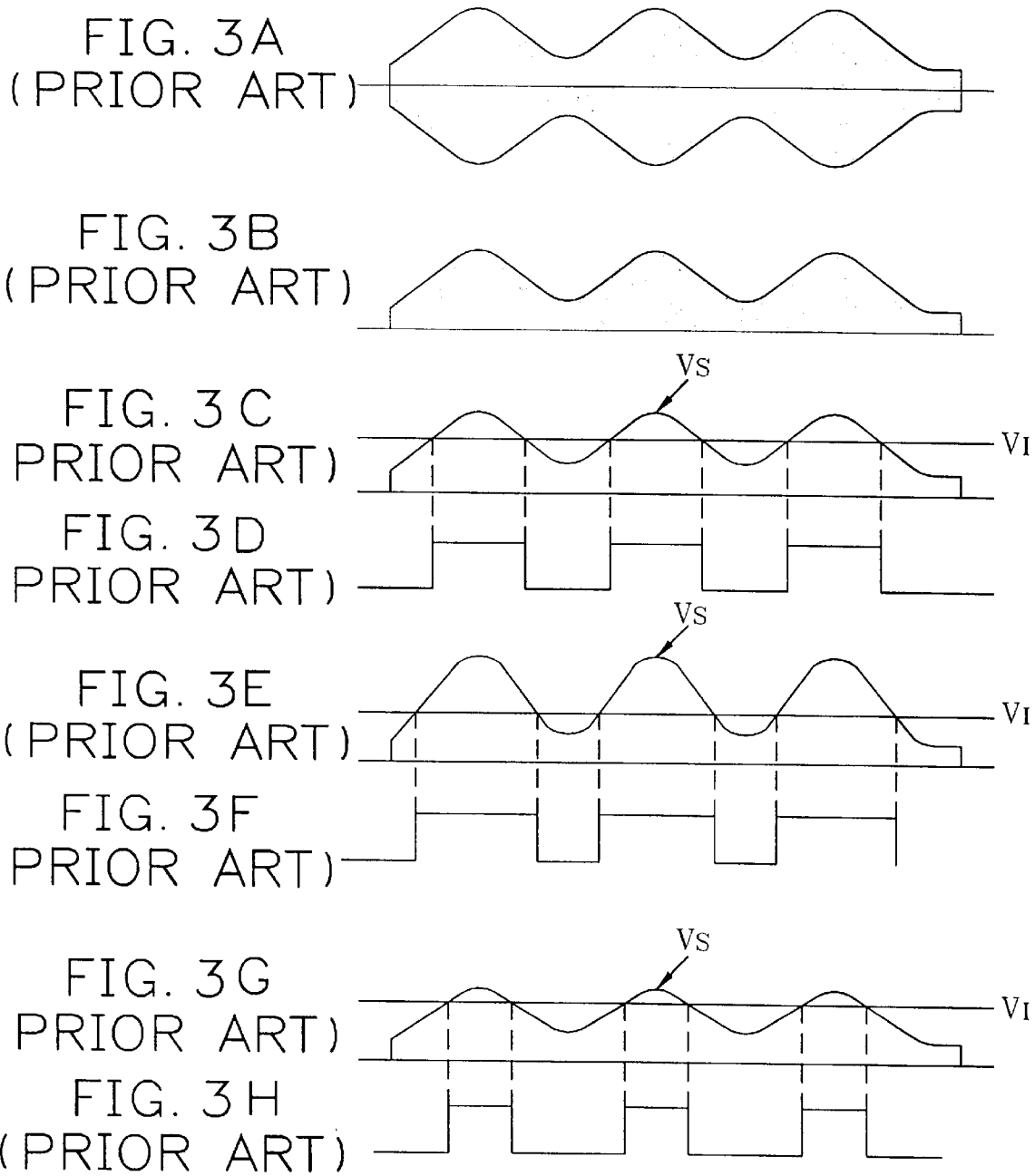
FIG. 3A through 3D are waveform diagrams of the respective elements of FIG. 1.
FIGS. 3E and 3F are waveform diagrams representing an envelope detection operation when an amplification factor of a playback amplifier is increased in FIG. 1.
FIGS. 3G and 3H are waveform diagrams representing an envelope detection operation when an amplification factor of a playback amplifier is decreased in FIG. 1.
Figure 4:
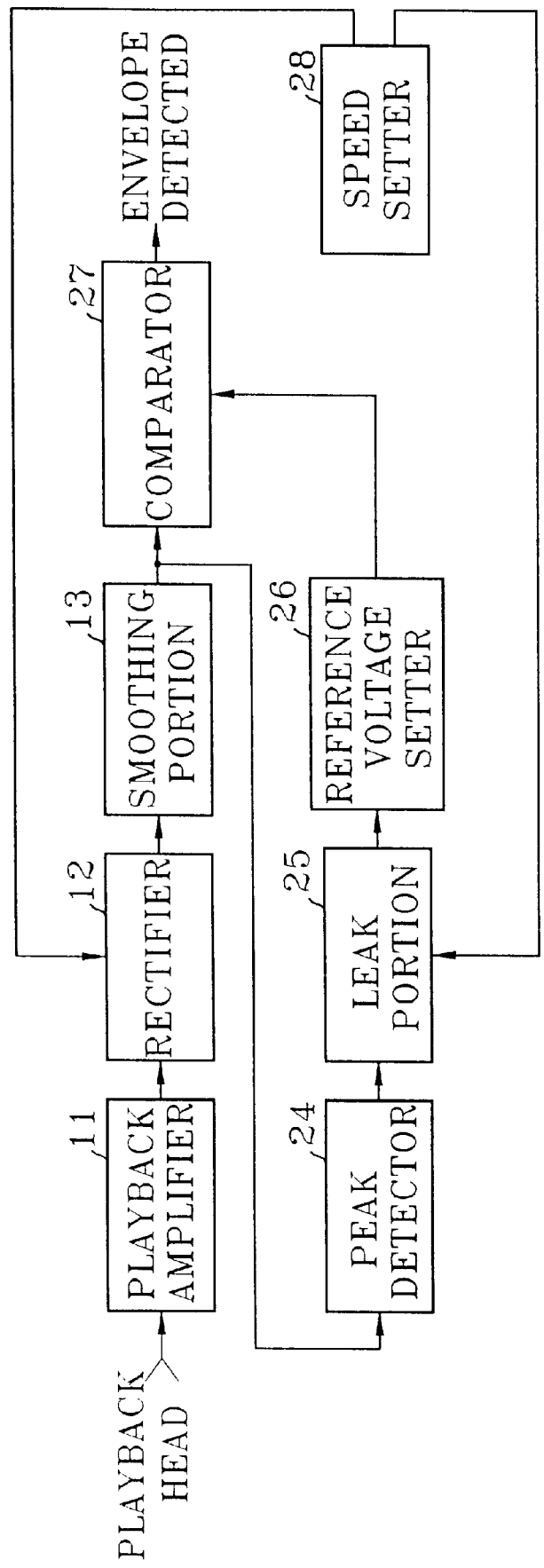
FIG. 4 is a block diagram of a conventional envelope detection apparatus.

Since the operations of a rectifier 41 and a smoothing portion 42 shown in FIG. 7 are the same as those of the blocks assigned by the same labels shown in FIGS. 1 and 4, the detailed description thereof will be omitted. The output waveform of the smoothing portion 42 is shown as Vs in FIG. 9C.

The comparator 431 of FIG. 8 compares the output signal Vs of the smoothing portion 42 with a first reference value $V_{I-1}$ input via the inverting input end (−) of the comparator 431, and generates a switching control signal having a high-level value when the output signal Vs of the smoothing portion 42 is greater than the first reference value $V_{I-1}$, as shown in FIG. 9D. The switching control signal is supplied to the switch 432 and is used for controlling a connection state of the switch 432. When a switching control signal having a low-level value is supplied to the switch 432, a moving contact of the switch 432 is connected to a contact "L" and the output signal Vs of the smoothing portion 42 is applied to the reference value setter 433 via the switch 432. A capacitor "C" is charged by the voltage signal applied to the reference value setter 433. On the other hand, when a switching control signal having a high-level value is generated when the output signal Vs of the smoothing portion 42 is greater than the first reference value $V_{I-1}$, the moving contact of the switch 432 is connected to a contact "H" to disconnect the smoothing portion 42 from the reference value setter 433. In this case, the capacitor "C" of the reference value setter 433 is discharged. Here, a maximum voltage $V_0$ can be distributed by varying a variable resistance value VR2 of the reference value setter 433, and the distributed voltage is output to a second reference value $V_{I-2}$. The second reference value $V_{I-2}$ output from the reference value setter 433 is input to an inverting input end (−) of the voltage comparator 44. The voltage comparator 44 compares the output signal Vs of the smoothing portion 42 with the second reference value $V_{I-2}$, applied from the reference voltage setter 43 to output the envelope detection result value of FIG. 9E. In FIG. 9C, since the output voltage Vs of the smoothing portion 42 is smaller than the charged voltage $V_0$ although an interval "a" belongs to a charging interval, discharging occurs actually in that interval.

Figure 10:
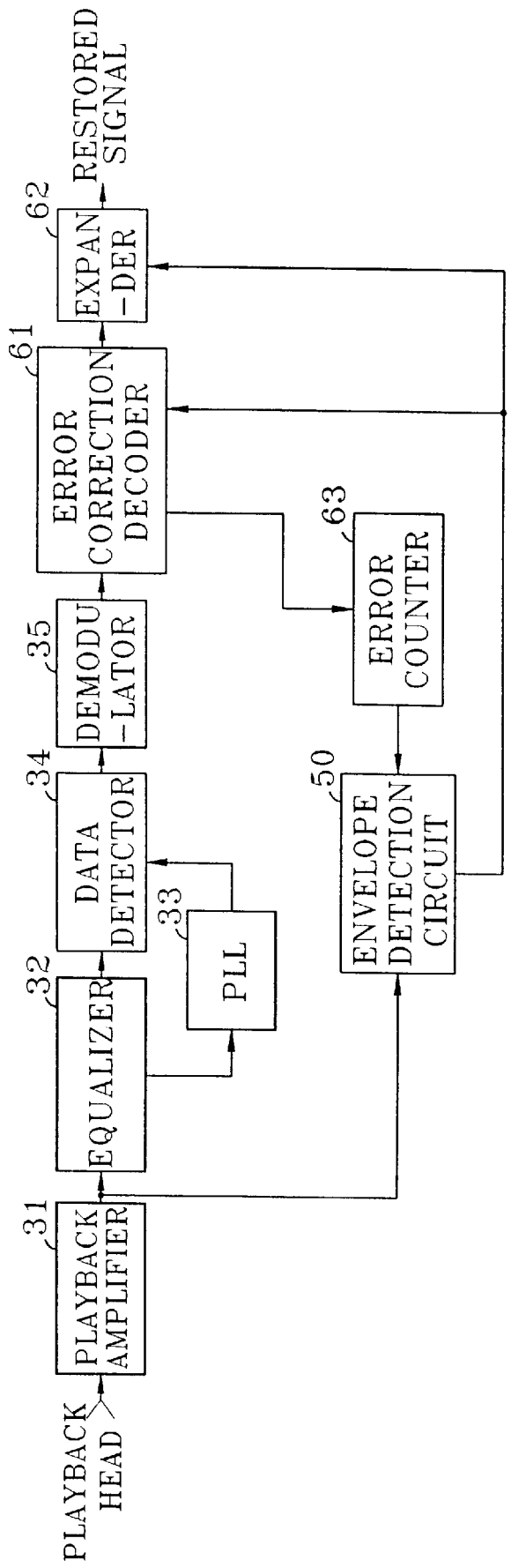
FIG. 10 is a block diagram of a digital VCR adopting an envelope detection circuit according to a second embodiment of the present invention.

FIG. 10 shows a second embodiment of a digital VCR in which an envelope detection circuit is adopted. In FIG. 10, an error correction decoder 61 detects an error from a received and demodulated signal and corrects the detected error using an error correction code received together with information data. An error counter 63 counts the number of errors detected in the error correction decoder 61 or the number of errors which have been detected but not been corrected by the error correction decoder 61, during the time when the envelope detection circuit 50 outputs a detected result value indicating that an envelope has been detected. Then, the counted result is divided by the number of clock pulses generated for the same interval of time to obtain a bit error rate (BER). The bit error rate calculated in the error counter 63 is applied to the envelope detection circuit 50.

Figure 11:
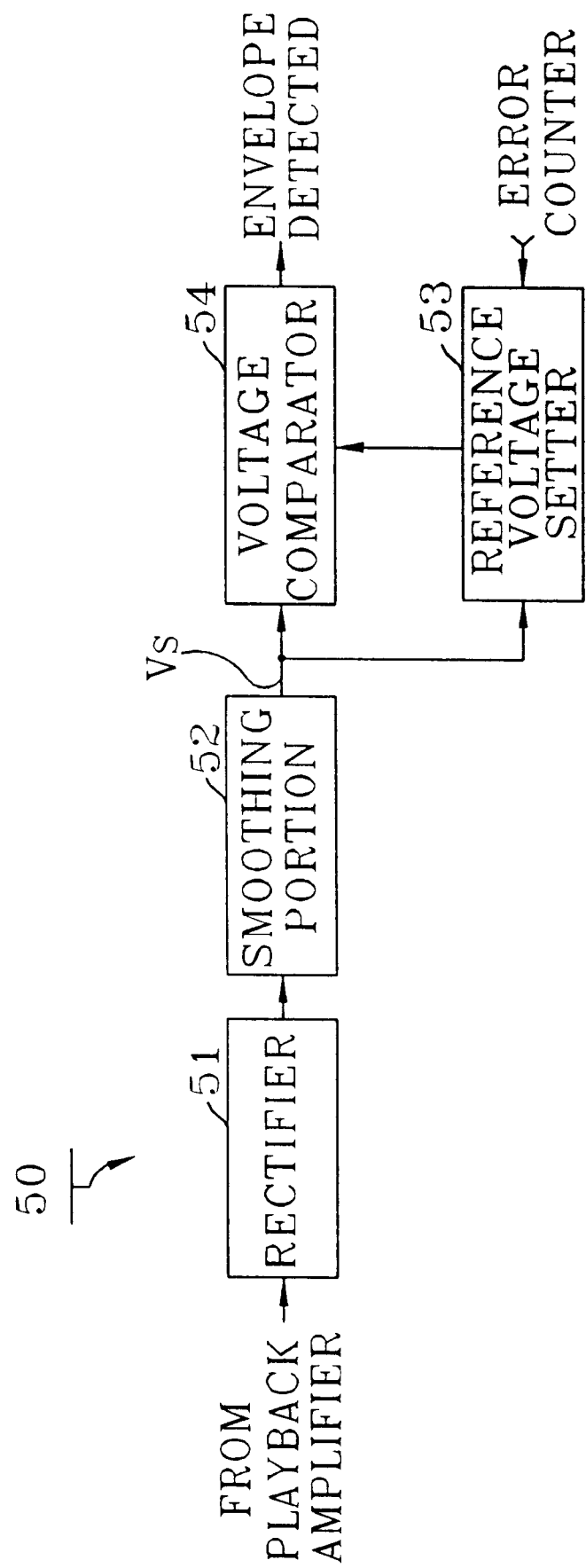
FIG. 11 is a block diagram of the envelope detection circuit shown in FIG. 10.

FIG. 11 shows the envelope detection circuit 50 shown in FIG. 10. The envelope detection circuit 40 of FIG. 7 sets a reference value which becomes a judgement standard of the envelope detection based on the output level of a reproduced signal, while the envelope detection circuit 50 of FIG. 11 sets a reference value reflecting the state of the system. In the analog VCR, a system state can be judged by measuring a C/N ratio, while in the digital VCR, a system state can be judged by measuring a BER. As shown in FIG. 11, the envelope detection circuit 50 includes a rectifier 51 and a smoothing portion 52. A reference voltage setter 53 sets a reference value based on the BER output from the error counter 63. A voltage comparator 54 compares the output signal of the smoothing portion 52 with the reference value and detects an envelope.

Figure 12:
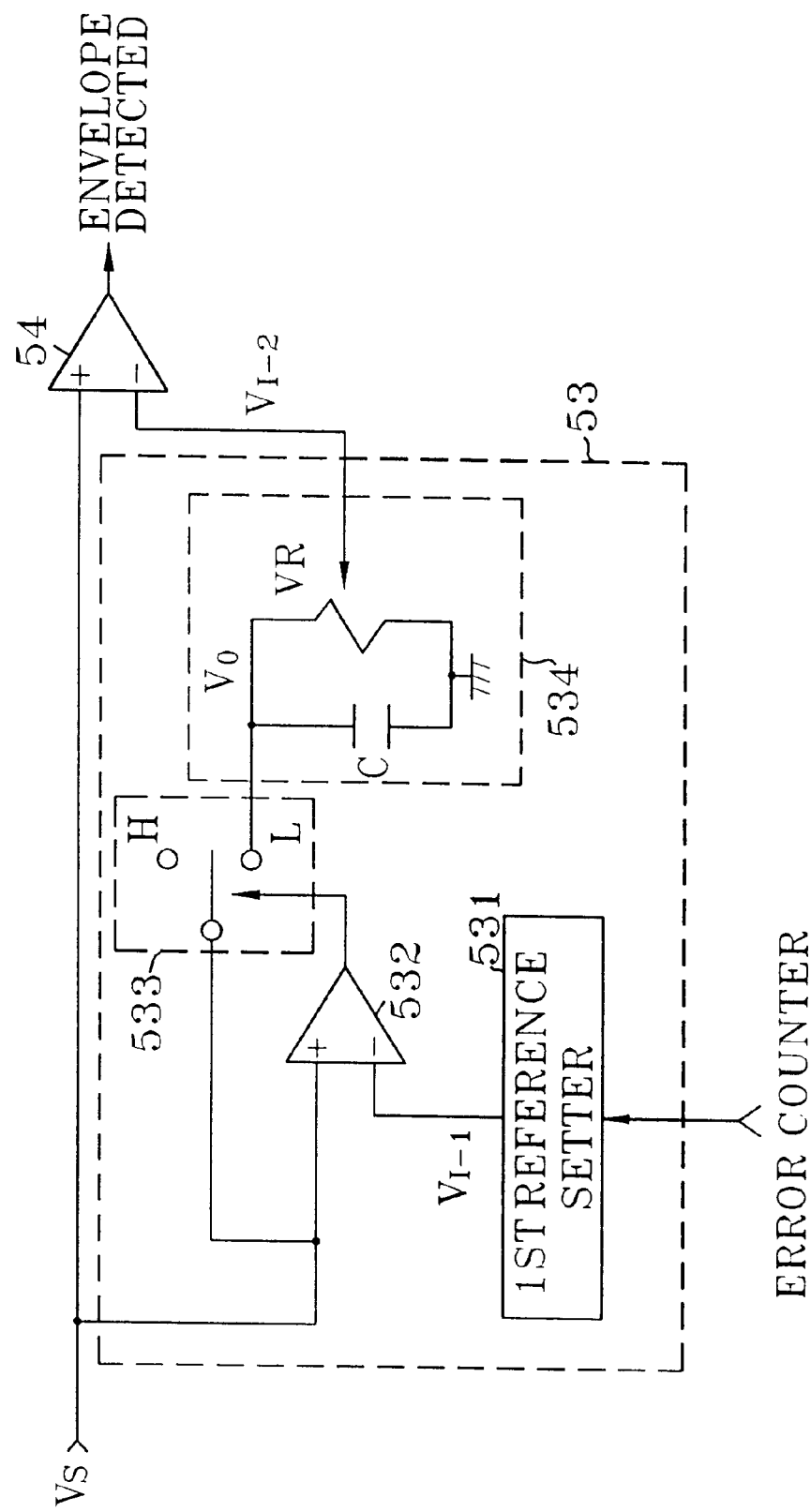
FIG. 12 is a circuit diagram of the reference voltage setter and the voltage comparator shown in FIG. 11.

An example of the reference voltage setter 53 shown in FIG. 11 is shown in FIG. 12. The reference voltage setter 53 includes a first reference value setter 531 for setting a reference value of the comparator 532 based on a BER applied from the error counter 63. The other construction of FIG. 11 is same as that of FIG. 8.

Referring to FIG. 13 showing an automatic setting operation of a reference value based on a BER, the first reference value setter 531 shown in FIG. 12 initializes the reference value to an arbitrary level. Initialized values of "0" are stored in storage areas for a previous BER value and a current BER value (step 100). The first reference value setter 531 stores the BER value applied from the error counter 63 in a storage area for the previous BER value (step 110). The first reference value setter 531 lowers the reference value set in step 100 by a one-step value (step 120), and then stores the next BER value applied from the error counter 63 in the storage area for the current BER value (step 130). The first reference value setter 531 compares the current BER value with the previous BER value and judges whether the current BER value is equal to or smaller than the previous BER value (step 140). If it is judged that the current BER value is not more than the previous BER value, the first reference value setter 531 stores the current BER value in the storage area for the previous BER value (step 150), and returns to step 120. On the other hand, if it is judged that the current BER value is greater than the previous BER value, the first reference value setter 531 stores the current BER value in the storage area for the previous BER value (step 160), and increases the current reference value by a one-step value (step 170). Then, the first reference value setter 531 stores the next BER value applied from the error counter 63 in the storage area for the current BER value (step 180). The first reference value setter 531 returns to step 140 to determine the next reference value.

When a reference value appropriate for the current state of the system via the above-described operations in the first reference value setter 531 is automatically set, the set reference value $V_{I-1}$ is input to a comparator 532. The comparator 532 compares the output signal Vs of the smoothing portion 52 with the first reference value $V_{I-1}$, as shown in FIG. 14A, and outputs a switching control signal shown in FIG. 14B. The second reference value setter 534 performs a charging and discharging operation according to the connection state of the switch 533 based on the switching control signal in order to output the second reference value $V_{I-2}$. The operation of second reference value setter 534 is similar to that of the reference value setter 433 of FIG. 8 described above, and therefore its description is omitted here. The voltage comparator 54 compares the output signal of the smoothing portion 52 with the second reference value $V_{I-2}$ output from the reference voltage setter 53, and outputs the envelope detection result value of FIG. 14C.

Referring to FIG. 14D, the amplification factor of the playback amplifier 31 is decreased, and therefore the signal Vs of FIG. 14D is a signal amplified by an amplification factor smaller than that of the signal Vs of FIG. 14A. Here, the first reference value setter 531 sets the first reference value $V_{I-1}$ which is proportional to the output level of the playback amplifier 31 through the reference value automatic setting operation described above with reference to FIG. 13. As a result, the envelope detection result value of FIG. 14F is obtained in the same manner as that of FIG. 14C.

The signal Vs of FIG. 15A is a signal amplified by an amplification factor which is the same as that of the signal Vs of FIG. 14A in which a BER is low because a recording medium, a head state and a transfer characteristic are excellent. In this case, the first reference value setter 531 automatically sets a first reference value lower than the first reference value $V_{I-1}$, of FIG. 14A. As a result, an envelope detection signal is obtained as the FIG. 15C signal having a width greater than that of FIG. 14C.

The signal Vs of FIG. 16A is a signal amplified by an amplification factor which is the same as that of the signal Vs of FIG. 14A in which a BER is high because a recording medium, a head state and a transfer characteristic are poor. In this case, the first reference value setter 531 automatically sets a first reference value higher than the first reference value $V_{I-1}$ of FIG. 14A. As a result, an envelope detection signal is obtained as the FIG. 16C signal having a width less than that of FIG. 14C.

Figure 17:
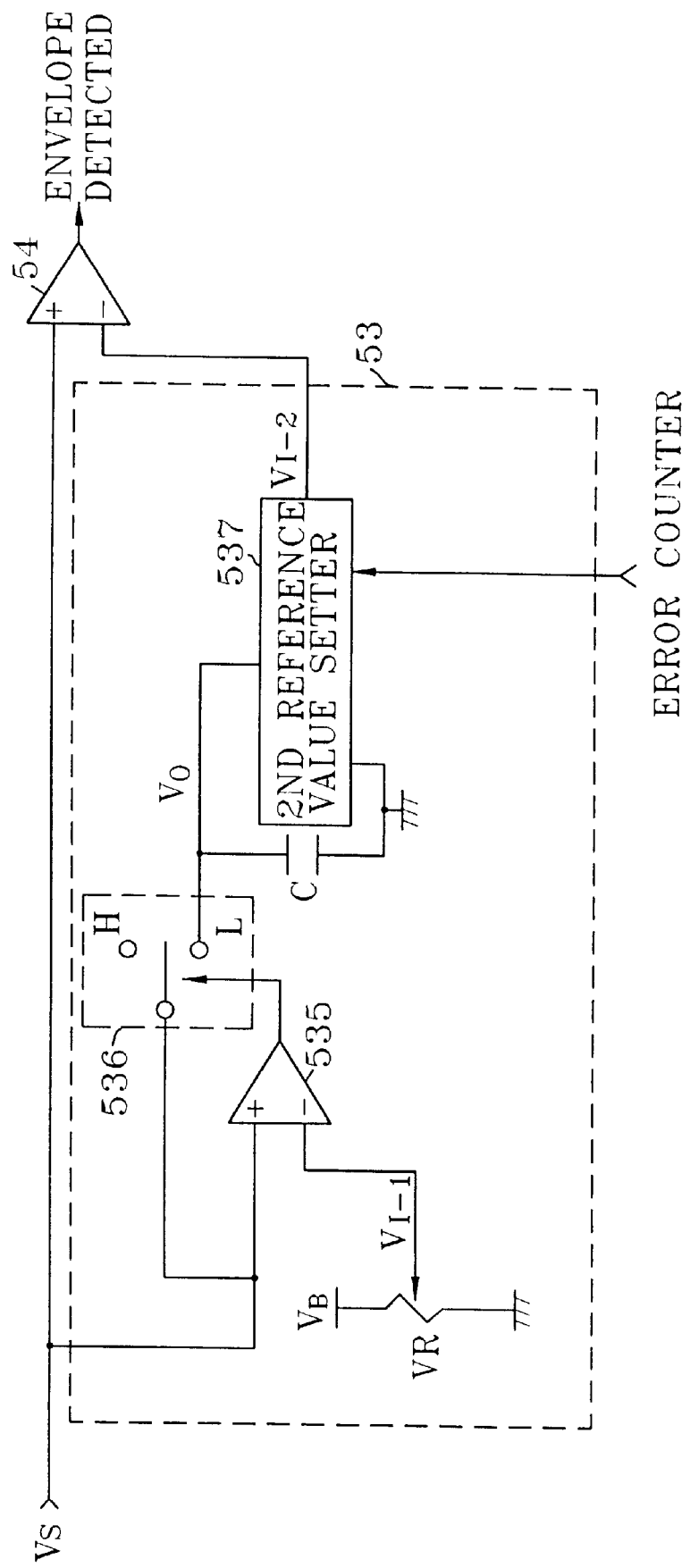
FIG. 17 is a circuit diagram showing another example of the reference voltage setter of FIG. 11.

FIG. 17 is a circuit diagram showing another example of the reference voltage setter 53 of FIG. 11. A second reference value setter 537 of the reference voltage setter 53 sets a second reference value $V_{I-2}$ to be supplied to the voltage comparator 54 based on the BER applied from the error counter 63, in which case the second reference value $V_{I-2}$ is set via the above-described automatic set operation of FIG. 13. The second reference value setter 537 is connected in parallel to a capacitor "C". The other construction of FIG. 17 is same as that of FIG. 8.

The BERs of the signals Vs of FIGS. 18A and 18D are the same. The second reference value setter 537 sets the second reference value $V_{I-2}$ based on the magnitude of the above-described signals Vs. As a result, the envelope detection signals shown in FIGS. 18C and 18F have the same width.

The BER of the signal Vs of FIG. 19A is smaller than that of the FIG. 18A signal Vs. In this case, the width of the envelope detection signal is increased, as shown in FIG. 19C.

The BER of the signal Vs of FIG. 20A is larger than that of the FIG. 18A signal Vs. In this case, the width of the envelope detection signal is decreased, as shown in FIG. 20C.

Figure 21:
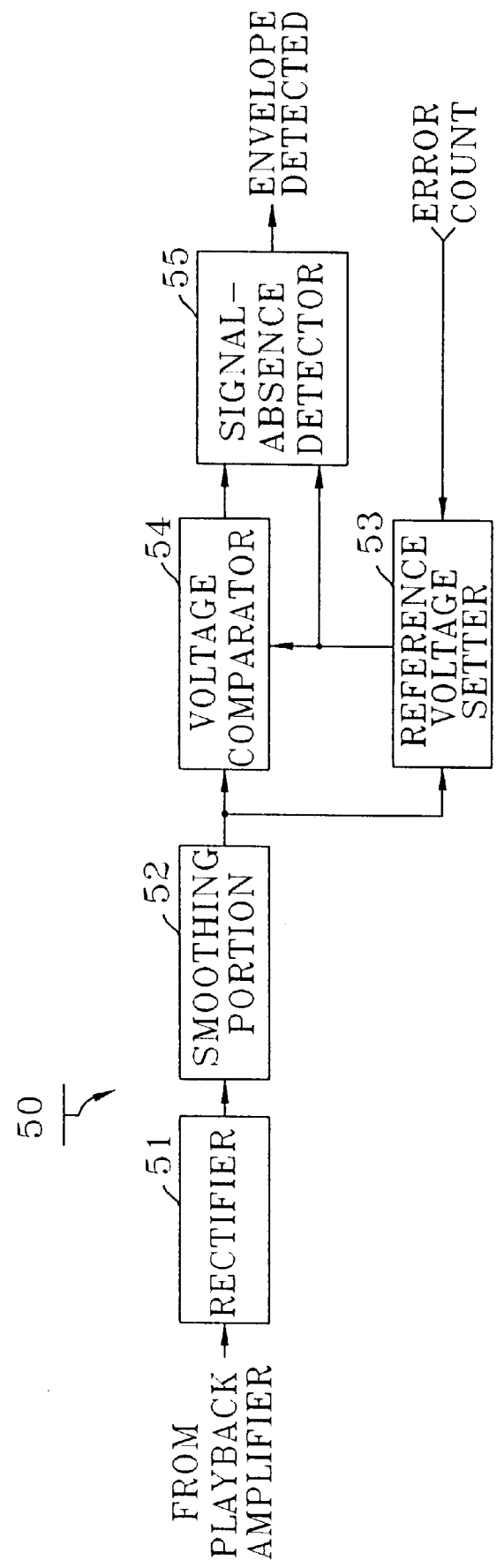
FIG. 21 is a circuit diagram showing another example of the envelope detection circuit of FIG. 10.

FIG. 21 is a circuit diagram showing another example of the envelope detection circuit 50 of FIG. 10. FIG. 21 has an apparatus for preventing an envelope detection error in a signal-absent section where no signals are recorded on a video tape. The FIG. 21 apparatus includes all the elements of the FIG. 11 apparatus, and additionally includes a signal-absence detector 55 for receiving the output signals of the reference voltage setter 53 and the voltage comparator 54 and detecting a signal-absence from the received signal.

Figure 22:
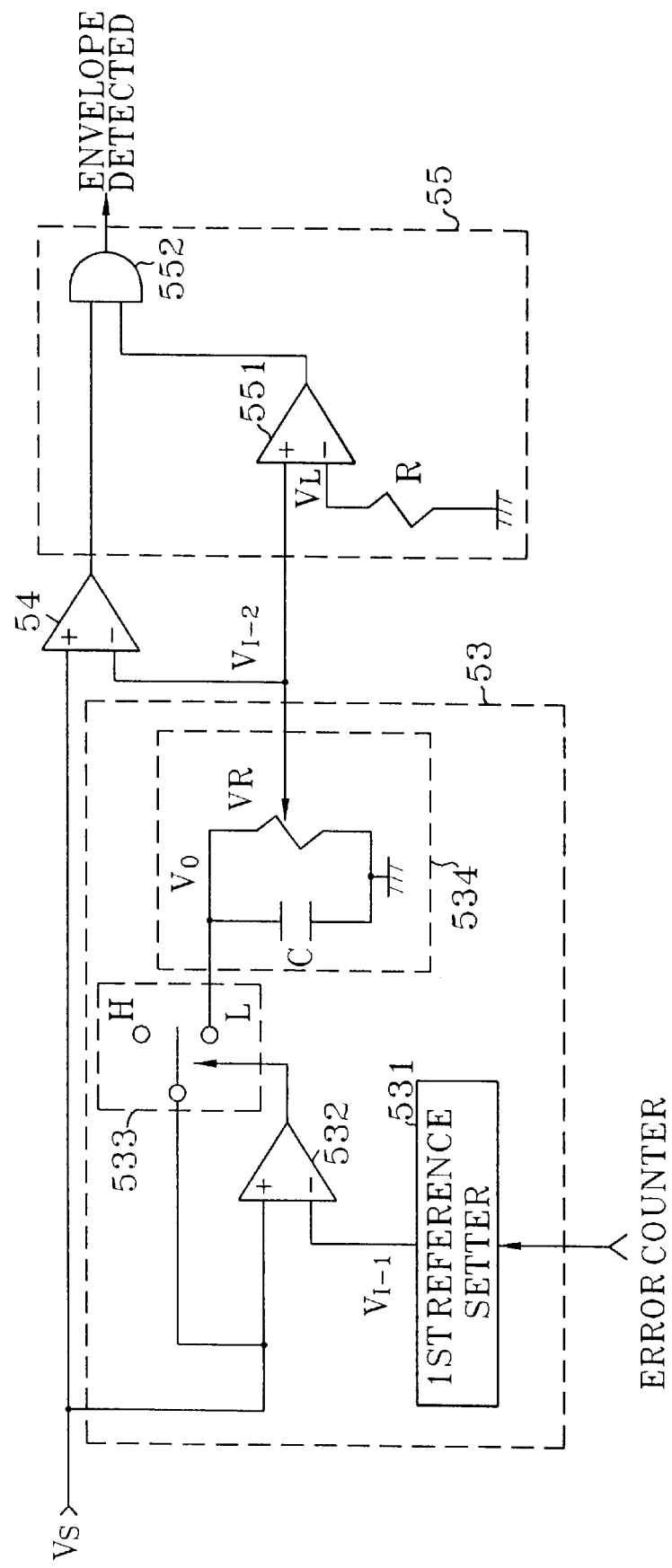
FIG. 22 is a circuit diagram of FIG. 21.

In FIG. 22 showing the details of the reference voltage setter 53, the voltage comparator 54 and the signal-absence detector 55, a comparator 551 of the signal-absence detector 55 receives the second reference value $V_{I-2}$ from the reference voltage setter 53, and compares this received signal with a predetermined reference value $V_L$ to detect a signal-absence section. Here, the reference value $V_L$ is set based on the level of the noise voltage output from the playback amplifier 31 in the signal-absence section of the video tape. That is, the comparator 551 generates the signal of FIG. 23D which is indicative of a signal-absence section when the reference value $V_{I-2}$ output from the reference voltage setter 53 is smaller than the predetermined reference value $V_L$. An AND gate 552 logically multiplies the levels of the signals shown in FIGS. 23C and 23D, which represent the outputs of voltage comparator 54 and of comparator 551, respectively, and generates the signal shown in FIG. 23E. The system turns off the power supply when the FIG. 23E signal is generated in order to prevent unnecessary power consumption.

The above-described embodiments of the present invention have been described based on the structure of the digital VCR. However, it is apparent that the present invention can be applied to a conventional analog VCR employing VHS and 8 mm tape.

As described above, the simple and compact envelope detection apparatus of the VCR according to the present invention can accurately detect an envelope which reflects the system state.

While only certain embodiments of the invention have been specifically described herein, it will apparent that numerous modifications may be made thereto without departing from the spirit and scope of the invention.

What is claimed is:

1. An envelope detection apparatus for detecting an envelope of video signal read from a video tape, the envelope detection apparatus comprising:

reference voltage setter for receiving a bit error rate (BER) calculated from an error correction result of the video signal and setting a second reference value based on the received BER; and a first comparator for comparing the level of the video signal with that of the second reference value set in said reference voltage setter to thereby detect the envelope form the video signal.

2. The envelope detection apparatus according to claim 1, wherein said reference voltage setter comprises:

a first reference value setter for comprising the received BER with a previous BER and setting a first reference value according to the comparison result;

a second comparator for comparing the video signal with the first reference value output from said first reference value setter, and generating a switching control signal according to the comparison result; and a second reference value setter for setting the second reference value which is increased when the switching control signal indicates that the level of the video signal from said second comparator is smaller than the first reference value, and is decreased when switching control signal indicates that the level of the video signal from said second comparator is larger than the first reference value, and supplying the second reference value to said first comparator for comparing the second reference value with the video signal.

3. The envelope detection apparatus according to claim 2, wherein said first reference value setter increases the first reference value when the received BER is greater than the previous BER, and decreases the first reference value when the received BER is smaller than the previous BER.

4. The envelope detection apparatus according to claim 2, wherein said second reference value setter comprises:

a charging and discharging circuit which is charged by the applied video signal; and a switch for switching the supply of the video signal to said charging and discharging circuit according to the switching control signal output from said second comparator, wherein said charging and discharging circuit performs a charging operation when said switch is turned on, and a discharging operation when said switch is turned off.

5. The envelope detection apparatus according to claim 4, wherein said charging and discharging circuit comprises a capacitor and a variable resistor connected in parallel.

6. The envelope detection apparatus according to claim 1, further comprising a signal-absence detector, connected to output ends of said reference voltage setter and said first voltage comparator, for detecting, when the envelope is not detected in said voltage comparator, whether a corresponding section of said video tape is a signal-absence section.

7. The envelope detection apparatus according to claim 6, wherein said signal-absence detector comprises:
   a second comparator for comparing the second reference value output from said reference voltage setter with a voltage based on the noise level of the signal-absence section in said video tape and generating a rectangular waveform indicative of a signal-absence section; and
   an AND gate for logically multiplying the output of said first comparator and the output of said second comparator.

8. The envelope detection apparatus according to claim 7, wherein said reference voltage setter comprises:
   a first reference value setter for comparing the received BER with a previous BER and setting a first reference value according to the comparison result;
   a third comparator for comparing the video signal with the first reference value output from said first reference value setter, and generating a switching control signal indicative of the comparison result; and
   a second reference value setter for setting the second reference value which is increased when the switching control signal indicates that the level of the video signal from said third comparator is smaller than the first reference value, and is decreased when the switching control signal indicates that the level of the video signal from said third comparator is larger than the first reference value, and supplying the second reference value to said second comparator of said signal=absence detector.

9. The envelope detection apparatus according to claim 8, wherein said first reference value setter increases the first reference value when the received BER is greater than the previous BER, and decreases the first reference value when the received BER is smaller than the previous BER.

10. The envelope detection apparatus according claim 8, wherein said second reference value setter comprises:
    a charging and discharging circuit which is charged by the applied video signal; and
    a switch for switching the supply of the video signal to said charging and discharging circuit according to the switching control signal output from said third comparator, wherein said charging and discharging circuit performs a charging operation when said switch is turned on, and a discharging operation when said switch is turned off.

11. The envelope detection apparatus according to claim 10, wherein said charging and discharging circuit comprises a capacitor and a variable resistor connected in parallel.

12. A method for detecting an envelope of a video signal read from a video tape, comprising the steps of:
    setting a second reference value based on received bit error rate (BER) calculated from an error correction result of the video signal; and
    detecting the envelope from the video signal by comparing the level of of the video signal with that of the second reference value.

13. The method according to claim 12, wherein said step of setting the second reference value comprises the steps of:
    setting a first reference value according to a comparison of the received BER with a previous BER;
    generating a switching control signal according to a comparison of the video signal with the first reference value;
    increasing the second reference value when the switching control signal indicates that the level of the video signal is smaller than the first reference value; and
    decreasing the second reference value when the switching control signal indicates that the level of the video signal is larger than the first reference value.

14. the method according to claim 13, wherein said step of setting the first reference value comprises the steps of:
    increasing the first reference value when the received BER is greater than the previous BER; and
    decreasing the first reference value when the received BER is smaller than the previous BER.

15. The method according to claim 13, wherein said steps of setting the second reference value further comprises the step of:
    charging and discharging a charging and discharging circuit by the applied video signal according to the switching control signal.

16. The method according to claim 15, wherein said charging and discharging circuit comprises a capacitor and a variable resistor connected in parallel.

17. The method according to claim 12, wherein further comprising the step of detecting, when the envelope is not detected, whether a corresponding section of said video tape is a signal-absence section.

18. The method according to claim 17, wherein said detecting step comprises the steps of:
    generating a rectangular waveform indicative of signal-absence section by comparing said second reference value with a voltage based on the noise level of the signal-absence section in said video tape; and
    logically multiplying the result of the comparison between the level of the video signal and the second reference value with the rectangular waveform.

19. The method according to claim 18, wherein said step of setting said second reference value comprises the steps of:
    setting a first reference value according the a comparison of the received BER with a previous BER;
    generating a switching control signal according to a comparison of the video signal with the first reference value;
    increasing the second reference value when the switching control signal indicates that the level of the video signal is smaller than the first reference value; and
    decreasing the switching control signal when the level of the video signal is larger than the first reference value.

20. The method according to claim 19, wherein said step of setting the first reference value comprises the steps of:
    increasing the first reference value when the received BER is greater than the previous BER; and
    decreasing the first reference value when the received BER is smaller than the previous BER.

21. The envelope detection apparatus according to claim 19, wherein step of setting the second reference value further comprises the steps of:
    charging and discharging a charging and discharging circuit by the applied video signal according to the switching control signal.

22. The method according to claim 21, wherein said charging and discharging circuit comprises capacitor and variable resistor connected in parallel.

23. An envelope detection apparatus for detecting an envelope of a video signal read from a video tape, the envelope detection apparatus comprising:

reference voltage setter for setting a second reference value which is altered according to a comparison of a level of the video signal with that of a predetermined first reference value; and a first comparator for comparing the level of the video signal with the level of the second reference value altered in said reference voltage setter to thereby detect the envelope from the video signal.

24. The envelope detection apparatus according to claim 23, wherein said reference value setter comprises:

a charging and discharging circuit which is charged by the applied video signal; and a switch the supply of the video signal to said charging and discharging circuit according to the switching control output from said second comparator, wherein said charging and discharging circuit performs a charging operation when said switch is turned on, and a discharging operation when said switch is turned off.

* * * * *